INVENTOR
MASAKAKA ISOGAWA

United States Patent Office 3,463,833
Patented Aug. 26, 1969

3,463,833
THERMOPLASTIC RESINOUS BLENDS OF ALPHA METHYL STYRENE-METHYL METHACRYLATE COPOLYMERS WITH GRAFT COPOLYMERS
Masataka Isogawa, Hyogo-ku, Kobe, Japan, assignor to Kanegafuchi Chemical Industry Company, Ltd., Osaka, Japan, a corporation of Japan
Filed Oct. 14, 1966, Ser. No. 586,708
Claims priority, application Japan, Oct. 28, 1965, 40/66,458
Int. Cl. C08f *41/12*
U.S. Cl. 260—876                                1 Claim

ABSTRACT OF THE DISCLOSURE

Thermoplastic composition comprising 60 to 90 parts by weight of a resin copolymer obtained by emulsion polymerization of a monomer mixture selected from the group consisting of (a) alpha methyl styrene, and methyl methacrylate, and (b) alpha methyl styrene, methyl methacrylate and acrylonitrile; and 40 to 10 parts by weight of a graft copolymer obtained by emulsion polymerization of from 35 to 65 percent by weight of synthetic diene rubber selected from the group consisting of polybutadiene, and copolymers of butadiene and monomers such as styrene, and acrylonitrile, and having latex particles at least 80 percent by weight of which being more than 0.1 micron in diameter, and from 65 to 35 percent by weight of a monomer composition selected from the group consisting of (a) methyl methacrylate, (b) methyl methacrylate and styrene, and (c) methyl methacrylate, styrene, and acrylonitrile.

---

Figure 1:
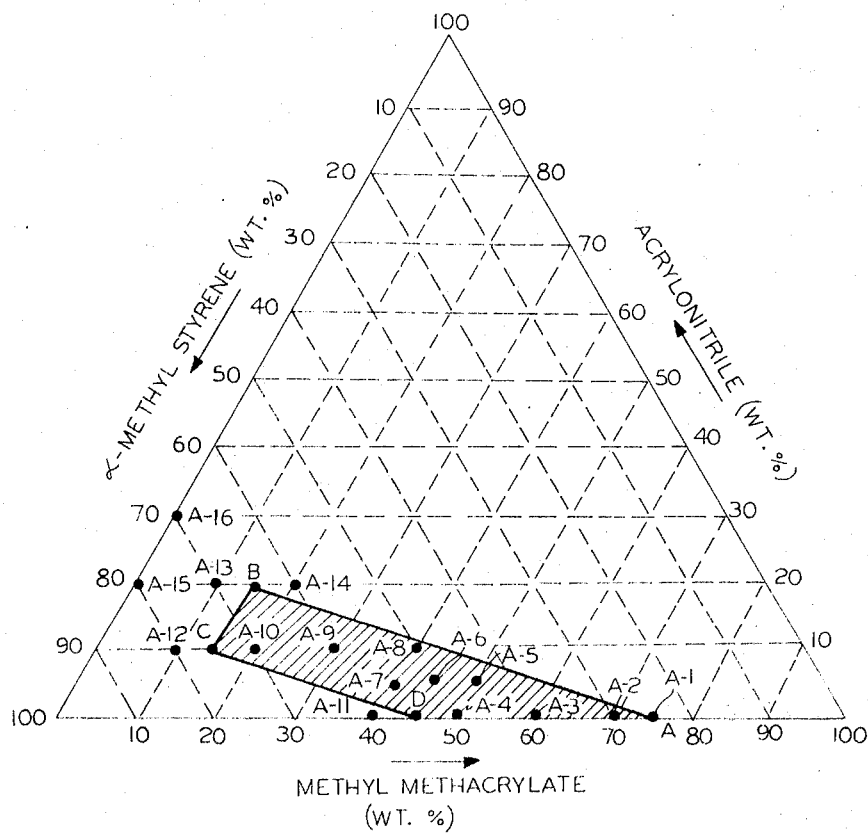

This invention relates to thermoplastic resinous compositions and more particularly to new thermoplastic resinous compositions having improved heat resistance and impact resistance properties.

Although there are presently numerous thermoplastic resins in existance, nearly all of them lack either high heat resistance, or high impact resistance or both. Even the few resins which may have these characteristics are not used extensively because of their high cost of manufacture and/or poor molding properties.

One priorly known thermoplastic resin which comprises a mixture of a copolymer of acrylonitrile and α-methyl styrene, and a graft copolymer of acrylonitrile, styrene and polybutadiene, has a relatively high heat resistance and high impact resistance. However, this resin is characterized by a relatively low heat distortion temperature of about 100° C., which limits its use; mere exposure to direct sunlight or hot water would tend to cause its deformation.

Another priorly known thermoplastic resin which comprises a copolymer of α-methyl styrene and methyl methacylate has better heat resistance properties than the aforementioned thermoplastic resin, and also has good transparency properties. However, this other resin is brittle and is difficult to polymerize. For example, bulk polymerization may require several days even though suitable catalysts and temperatures are employed.

It has been suggested that impact resistance may be improved by polymerizing a monomer mixture comprising α-methyl styrene and methyl methacrylate having polybutadiene dissolved therein. The resulting resin, although having improved impact resistance, was found to be difficult to polymerize, and its impact resistance was found not to be sufficient for some uses. The speed of polymerization was found to be so low as to discourage commercial use.

Various monomers and mixtures of monomers have priorly been polymerized in the presence of synthetic diene rubber in the latex form to produce a variety of thermoplstic resins. However, none of these prior resins has a combination of high impact resistance and high heat resistance properties. In one example, when mixtures of α-methyl styrene and methyl methacrylate, or α-methyl styrene, methyl methacrylate and acrylonitrile were polymerized with synthetic diene rubber latex, it was found that the speed of polymerization and conversion ratio were reduced and the latex was unstable during the polymerization thereby making proper polymerization difficult to attain. The rate or speed of polymerization may be increased by adding an emulsifier in sufficient quantity for appropriate stabilization of the latex. However, the resins produced by this method do not exhibit satisfactory impact resistance. This difficulty has been observed to be especially pronounced when the synthetic diene rubber latex particles are relatively large. It has been found that the lack of polymerizability of the foregoing monomer mixtures in some way inhibits the impact resistance properties of the resulting resins. Apparently the large particles inhibit or delay polymerization thus reducing the rate of grafting and cause instability of the latex.

It is thus an object of this invention to provide a novel thermoplastic resinous compound which is characterized by improved heat resistance, impact resistance and molding properties, and which is inexpensively manufacturable in relatively short time durations and on a commercially feasible scale.

As a result of extensive experiments, I have discovered a group of novel thermoplastic resinous compositions which possess the foregoing advantageous properties. The novel compositions comprise a first group of copolymers of α-methyl styrene and methyl methacrylate, or α-methyl styrene, methyl methacrylate and acrylonitrile, in predetermined proportions, and a second group of graft copolymers of from 65 to 35 weight percent of either methyl methacrylate, or methyl methacrylate and styrene, or methyl methacrylate, styrene and acrylonitrile, in predetermined proportions and from 35 to 65 weight percent of synthetic diene rubber in latex form. The synthetic diene rubber preferably comprises from 5 to 30 weight percent of the resinous composition. The first and second group of copolymers may be obtained by emulsion polymerization.

Figure 2:
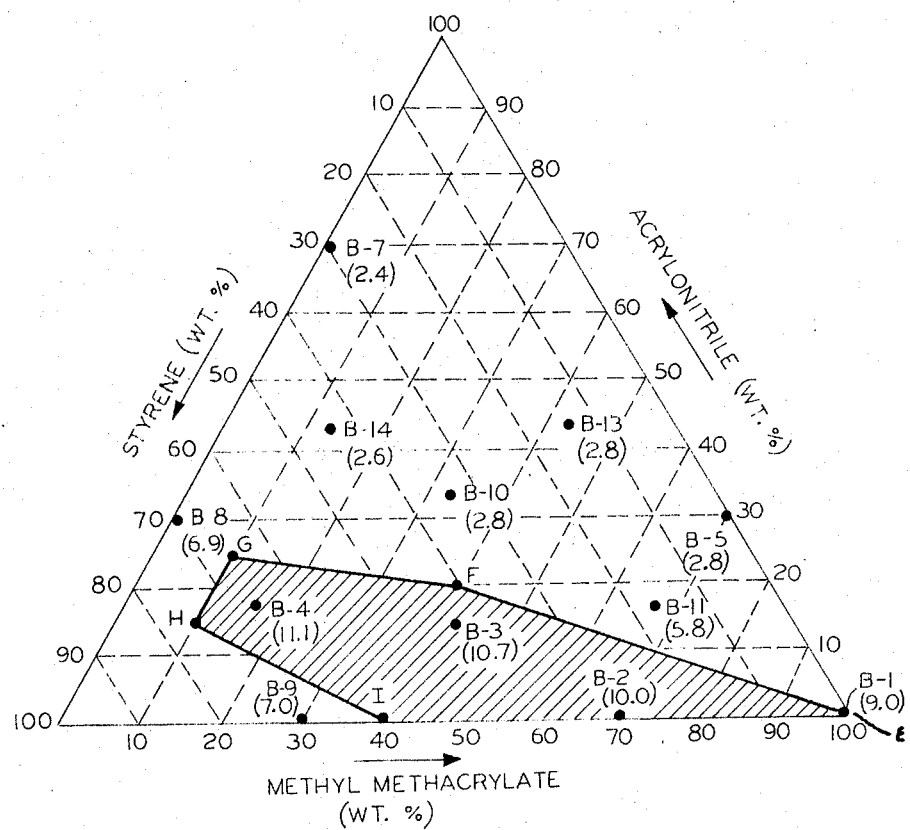

The specific details of the invention may be more readily understood when considered in connection with the below examples and tables, and the drawing in which:

FIG. 1 depices a graph of the most suitable proportions of the components of the first group copolymers utilized in this invention, and FIG. 2 depicts a graph of the most suitable proportions of the components of the second group copolymers utilized in this invention.

The heat resistance of the resinous composition is influenced to a large extent by the components of the first group copolymers in the composition, and the impact resistance of the resinous composition is inffuenced to a large degree by the components of the second group copolymers. Accordingly, the proportion of one group of copolymers to the other group is chosen in a suitable manner to obtain the most desired heat resistance and impact resistance properties in the resinous compositions.

I have found that satisfactory impact resistance and heat resistance properties are obtained by first separately producing the first group copolymers and then subsequently adding the second group graft copolymers thereto. The second group graft copolymers may be produced prior to, concurrently with, or subsequent to the production of the first group copolymer, but should in any event be formed separately from the first group copolymer.

One of the components of the inventive resinous composition is the first group copolymer produced from a monomer mixture comprising either α-methyl styrene and methyl methacrylate, or α-methyl styrene, methyl methacrylate and acrylonitrile. It has been found that the heat resistance of the final resin will depend upon the proportion of the different components of the monomer mixtures. Thus, the proportion of components are not limited to any specific values; rather, the proportions are selected to give the required heat resistance properties to the resulting resinous composition. It is highly desirable to select proportions which will give a softening point of the composition of about 140° C.

The softening point, which is measured for many of the following examples which follow, may be measured by first forming a sample by heating and pressing the product into a film which is from about 0.1 to 0.2 mm. thick. A test piece about 5 mm. wide and 10 mm. long is cut from the film. A load of about 100 g./mm.$^2$ is placed on the test piece. The temperature is raised from room temperature at about a rate of 2° C./minute. The relationship between the elongation and temperature is observed, and the temperature at which the test piece is caused to bend is taken as the softening point. The softening point mentioned in the examples were measured in the foregoing manner.

The polymerizability of the monomer mixture which forms the first group copolymers varies according to the components used therein. It has been found that the polymerizability varies directly with the amount of acrylonitrile and inversely with the amount of α-methyl styrene which is used. The proportion of the components should be selected to give the optimum polymerizability since reduced polymerizability would tend to reduce the yield and require removal of residual monomers. I have discovered that the proportions of components delineated by the shaded area in the graph of FIG. 1 give the optimum polymerizability, as well as other optimum properties to the ultimate resinous composition. Representative limits to the proportions are defined by points A, B, C, and D, which are listed below in Table 1.

TABLE 1

| Points | α-Methyl styrene (wt. percent) | Methyl methacrylate (wt. percent) | Acrylonitrile (wt. percent) |
|---|---|---|---|
| A | 25 | 75 | 0 |
| B | 65 | 15 | 20 |
| C | 75 | 15 | 10 |
| D | 55 | 45 | 0 |

The first group copolymers may be manufactured by an emulsion polymerization method, which it has been found enhances the speed of polymerization. The increase in speed, advantageously, allows an increase in the proportion of α-methyl styrene to methyl methacrylate, thereby improving the heat resistance properties of the resulting resinous composition. The velocity of polymerization may be further accelerated by adding a small amount of acrylonitrile. The emulsion polymerization may be carried out by any known method. For example, the foregoing monomer mixtures of the first group copolymers may be treated in aqueous dispersions in the presence of free radical polymerization initiators. The free radical polymerization initiators may be, for example, potassium persulfate, ammonium persulfate, cumene hydroperoxide, and other peroxides, and the like. Other agents may be employed in the process in a known manner, for example, polymerization promoting agents, chain transfer reagents, emulsifiers, and the like.

Another component of the inventive composition is the second group graft copolymers which are obtained by emulsion polymerization of a mixture comprising from 65 to 35 percent by weight of a monomer mixture comprising either methyl methacrylate, or methyl methacrylate and styrene, or methyl methacrylate, styrene and acrylonitrile; and from 35 to 65 percent by weight of synthetic diene rubber. The graft copolymers impart impact resistance properties to the resulting resinous compositions. The proportions of the components of the monomer mixture depend upon the impact resistance properties which are desired. Thus, the proportions are not limited to any particular values; instead, the proportions depend upon the impact resistance properties desired of the resulting compositions. In any event, however, the components of the monomer mixtures preferably are defined in proportions by the shaded area of the graph of FIG. 2, which is bounded by points E, F, G, H, and I. The percentages of components corresponding to these points are listed in the below Table 2.

TABLE 2

| Points | Methyl methacrylate (wt. percent) | Styrene (wt. percent) | Acrylonitrile (wt. percent) |
|---|---|---|---|
| E | 100 | 0 | 0 |
| F | 40 | 40 | 20 |
| G | 10 | 65 | 25 |
| H | 10 | 75 | 15 |
| I | 40 | 60 | 0 |

The second group graft copolymers may be obtained by an emulsion polymerization process. In such a process, synthetic diene rubber and the selected monomer mixture may be treated in aqueous dispersions in the presence of free radical polymerization initiators. The synthetic diene rubber may be first dispersed in the aqueous dispersion, and the monomer mixture added subsequently thereto. The grafting rate of the second group copolymers may be increased by maintaining the ratio of monomer to copolymer as low as possible and adjusting the rate of addition of the monomer mixture to the synthetic diene rubber latex to be no higher than the polymerization rate. This would enhance the impact resistance of the resinous composition resulting from the blending of the first and second group copolymers.

The size of the synthetic diene rubber latex is preferably large with more than 80 percent by weight having diameters greater than 0.1 micron. Examples of synthetic diene rubber which may be used in this invention are polybutadiene, polyisoprene, polychloroprene, butadiene-styrene copolymer, butadiene-acrylonitrile copolymer, isoprene-isobutylene copolymer and the like. However, it is preferable to use butadiene copolymers such as polybutadiene, butadiene-styrene copolymer, butadiene-acrylonitrile copolymer and the like. The free radical polymerization initiator may include potassium persulfate, ammonium persulfate, cumene hydroperoxide, various peroxides and the like. As in the case of the production of the first group copolymers, other agents may be employed in the production of the second group graft copolymers, such as, for example, polymerization promoting agents, chain transfer reagents, emulsifiers, and the like. The synthetic diene rubber content of the resulting resinous composition should be within the range of from 5 to 30 percent by weight of the total composition.

The heat resistance and impact resistance properties of the ultimate resinous composition depend mainly upon the amount and kind of components in the monomer mixtures used to form the first and second group copolymers, and also upon the blending mixture of one with respect to the other. The blending of the two groups of copolymers may be done by any known method. For example, the respective latex of the first and second group copolymers may be mixed and coagulated into salts which are in their solid states. The solids may then be filtered, washed and dried. As an alternative method, powders or pellets of the first and second group copolymers may be employed for blending after first kneading with the use of rollers, screws, Banbury mixers, kneaders and the like. Various agents may be added at the time of blending, such as, for example, stabilizers, pigments, fillers, plasticizers, and the like.

The following specific examples are given as being illustrative of this invention.

Production of the first group copolymers

The following substances were placed in a reaction vessel which was equipped with a stirrer, a reflux cooler, a nitrogen intake pipe, a thermometer, and a dropping funnel: Water in 250 parts by weight; sodium oleate in 3 parts by weight; ascorbic acid in 0.2 part by weight; ferrous sulfate hydrate in 0.0025 part by weight; and disodium salt of ethylenediamine acetic acid in 0.01 part by weight. After deoxygenation, and in a stream of nitrogen gas applied through the intake pipe, the mixture of substances was heated to a temperature of about 60° C. and stirred. Thereafter, monomer mixtures of various components such as listed in the below Table 3, in 100 parts by weight, and containing cumene hydroperoxide in 0.3 part by weight, and mixed tertiary mercaptans in 0.3 part by weight, were put into the dropping funnel and continuously added to the reaction vessel at a constant rate for about five hours. After the monomer mixtures were completely mixed with the other substances in the reaction chamber, the stirring was continued for about one hour at a temperature of about 60° C.

A copolymer latex was formed which was subsequently coagulated with sodium chloride and hydrochloric acid. The resulting product was coalesced by heating, then filtered, washed and dried. The polymerization conversion rate and the softening point of the first group copolymer product obtained by the foregoing process with monomer mixtures of various components, were measured. The results are given below in Table 3. The softening points were measured according to the procedure given above. The various samples listed below were obtained with monomer mixtures having different percentages of components. These samples are plotted on the graph of FIG. 1 as to the different components and percentages thereof.

TABLE 3

| No. | α-Methyl styrene | Methyl methacrylate | Acrylonitrile | Polymerization conversion (percent) | Softening point (° C.) |
|---|---|---|---|---|---|
| A-1 | 25 | 75 | 0 | 96 |  |
| A-2 | 30 | 70 | 0 | 94 | 149 |
| A-3 | 40 | 60 | 0 | 95 | 155 |
| A-4 | 50 | 50 | 0 | 86 | 158 |
| A-5 | 45 | 50 | 5 | 90 | 150 |
| A-6 | 50 | 45 | 5 | 88 |  |
| A-7 | 55 | 40 | 5 | 88 | 154 |
| A-8 | 50 | 40 | 10 | 95 | 143 |
| A-9 | 60 | 30 | 10 | 89 | 148 |
| A-10 | 70 | 20 | 10 | 85 | 151 |
| A-11 | 60 | 40 | 0 | 75 | 163 |
| A-12 | 80 | 10 | 10 | 78 | 146 |
| A-13 | 70 | 10 | 20 | 84 | 138 |
| A-14 | 60 | 20 | 20 | 97 | 135 |
| A-15 | 90 | 0 | 20 | 82 | 138 |
| A-16 | 70 | 0 | 30 | 95 | 132 |

Analysis of the foregoing Table 3, will reveal that both the softening point and the polymerization conversion rate are relatively high in the cases of sample numbers A-1 through A-10. These samples were obtained from monomer mixtures having components of proportions falling within the percentages defined by the shaded area of the graph of FIG. 1, which delineates the most suitable component proportions used in this invention to obtain the first group copolymers. The components of the monomer mixtures which were in percentages falling outside of the shaded area of the graph of FIG. 1 resulted in samples numbers A-11 through A-16. In these samples, either the softening point is low or the polymerization conversion is low or both.

Production of the second group graft copolymer

A mixture comprising polybutadiene rubber latex in 84.7 parts by weight (with 50 parts by weight being solids), water in 215.3 parts by weight, ascorbic acid in 0.2 part by weight, ferrous sulfate hydrate in 0.0025 part by weight and disodium salt of ethylene diamine tetra acetic acid in 0.01 part by weight, was put into a reaction chamber of the type similar to that used to form the first group copolymers. The mixture was agitated at a temperature of about 60° C. in a stream of nitrogen gas after deoxygenation.

Next, a monomer mixture comprising various monomers in different proportions such as listed in the below Table 4, in an amount of about 50 parts by weight, and having cumene hydroperoxide in 0.2 part by weight and mixed tertiary mercaptans in 0.15 part by weight dissolved therein, were placed in the dropping funnel. The monomer mixture was added to the reaction vessel through the dropping funnel at a constant rate for about three hours. After about one half of the monomer mixture was added to the reaction vessel, sodium oleate in 1.0 part by weight in a ten percent solution, was added to the mixture in the reaction vessel. After this addition, the stirring was continued for about another one hour at a temperature of about 60° C.

As a result, graft copolymer latex were formed. The latex were coagulated with sodium chloride and hydrochloric acid. The resulting products were coalesced by heating, then filtered, washed, and dried.

The various samples having different component percentages of the monomer mixtures were tested for polymerization conversion and stability. The results are listed in the below Table 4. The stability was measured in qualitative terms. The samples and the different component proportions are plotted on the graph of FIG. 2. The numbers in the brackets next to the sample number in the graph are the Izod impact strength measured in kg.-cm./cm.$^2$ for products obtained by blending the copolymer of sample number A-1 with the graph copolymer sample numbers B-1 through B-5, and B-7 through B-11, B-13, and B-14, respectively.

| No. | Methyl methacrylate | Styrene | Acrylonitrile | Polymerization conversion (percent) | Stability |
|---|---|---|---|---|---|
| B-1 | 50 | 0 | 0 | 91 | Stable. |
| B-2 | 35 | 15 | 0 | 96 | Do. |
| B-3 | 21.5 | 21.5 | 7 | 94 | Do. |
| B-4 | 8.3 | 33.4 | 8.3 | 89 | Do. |
| B-5 | 35 | 0 | 15 | 87 | Rather unstable. |
| B-6 | 15 | 0 | 35 |  | Coagulate. |
| B-7 | 0 | 15 | 35 | 80 | Rather unstable. |
| B-8 | 0 | 35 | 15 | 90 | Stable. |
| B-9 | 15 | 35 | 0 | 87 | Do. |
| B-10 | 16.6 | 16.7 | 16.7 | 85 | Rather unstable. |
| B-11 | 33.4 | 8.3 | 8.3 | 88 | Stable. |
| B-12 | 8.3 | 8.3 | 33.4 |  | Coagulate. |
| B-13 | 21.5 | 7 | 21.5 | 80 | Unstable. |
| B-14 | 7 | 21.5 | 21.5 | 80 | Rather unstable. |

Consideration of the foregoing Table 4 reveals that samples numbered B-1 through B-4, which were formed from monomer mixtures comprising components having percentages which fall within the shaded area of the graph of FIG. 2, have stable latex, and have high polymerization conversion. In the cases of samples B–5 through B–14, which were formed from monomer mixtures comprising components having percentages which were outside of the shaded area of the graph of FIG. 2, were characterized by either unstable latex, or low polymerization conversion or both. One conclusion which may be drawn from the foregoing examples is that the components of the monomer mixtures used to form the second group graft copolymers should be in proportions which fall within the limits delineated by the shaded area of the graph of FIG. 2, in order to produce the best results.

Production of the thermoplastic resinous compositions

Samples weighing about 105 grams of each of samples numbered A–1, A–6, and A–10 were separately melted on a roll mill heated to about 170° C. to 180° C. To each of these melted samples were added about 45 grams of each of the second group graft copolymers listed in the below Table 5, and blended for about 5 minutes. The first group copolymers (samples A) and the second group graft copolymers (samples B) were homogeneously mixed to yield a uniform sheet of thermoplastic composition. The polybutadiene content of the resulting composition was about 16 percent. Each of the resinous compositions resulting from the blending of samples A and B were tested for impact strength. The results are given in the below Table 5, in terms of Izod impact strength (with notch).

TABLE 5

| Second group graft copolymers sample | First group copolymers sample impact strength (kg.-cm./cm.$^2$) | | |
|---|---|---|---|
| | A–1 | A–6 | A–10 |
| B–1 | 9.0 | 10.8 | 10.4 |
| B–2 | 10.0 | 12.3 | 12.9 |
| B–3 | 10.7 | 11.2 | 11.9 |
| B–4 | 11.1 | 12.4 | 10.8 |
| B–5 | 2.8 | 2.8 | 2.9 |
| B–7 | 2.4 | 2.6 | 2.2 |
| B–8 | 6.9 | 5.4 | 5.4 |
| B–9 | 7.0 | 6.8 | 3.4 |
| B–10 | 2.8 | 2.8 | 3.0 |
| B–11 | 5.8 | 6.5 | 9.6 |
| B–13 | 2.8 | 2.6 | 2.6 |
| B–14 | 2.6 | 2.6 | 2.9 |

It is readily apparent from Table 5 that the impact resistance of the resinous compositions produced in accordance with the foregoing method is largely determined by the composition of the second group copolymers (sample B), and not by the composition of the first group copolymers (sample A). The graft copolymer samples B–1 through B–4, which were formed from monomer mixtures comprising components in proportions which fell within the shaded area of the graph of FIG. 2, produced resinous compositions having especially good impact resistance properties.

Representative samples of the first and second group copolymers formed from representative components were prepared and tested. Samples A–1 and A–5 of the first group copolymers in 68.6 parts by weight were separately mixed with sample B–2 in 31.4 parts by weight, and blended together. The blended mixture was coagulated, then filtered, washed, and dried in the manner just described thereby producing the final resinous composition product. The A and B samples were formed from monomer mixtures having components which were in proportions delineated by the shaded area of the graphs of FIGS. 1 and 2. The products were tested for tensile strength, impact strength, hardness and heat distortion. The results of these tests are given in the below Table 6.

TABLE 6

| Tests | Components of resinous product | |
|---|---|---|
| | A–1 (68.6 parts), B–2 (31.4 parts) | A–5 (68.6 parts), B–2 (31.4 parts) |
| Tensile strength (kg./cm.$^2$) ASTM D–636 | 513 | 505 |
| Izod impact strength with notch, ASTM D–256 | 10.6 | 12.3 |
| Rockwell hardness (R) ASTM D–785 | 109 | 110 |
| Heat distortion temperature (° C.) with 18.6 kg./cm.$^2$ load ASTM D–648 | 120 | 125 |

As is evident, the products produced by this invention have excellent mechanical and physical properties, especially heat resistance and impact resistance.

Various modifications and extensions of this invention will become evident to those skilled in the art. All such variations and deviations, which basically rely on the teachings through which this invention has advanced the art, are properly considered within the spirit and scope of this invention.

What is claimed is:
1. Thermoplastic resinous composition comprising:
 (A) about 70 to about 90 parts by weight of a first group resin copolymer obtained by emulsion polymerization of a monomer mixture consisting of alpha methyl styrene, methyl methacrylate, and acrylonitrile, the components of said monomer mixture being defined by the shaded area of the graph of FIGURE 1; and
 (B) about 30 to about 10 parts by weight of a second group graft copolymer obtained by emulsion polymerization of from
  (1) 35 to 65 percent by weight of synthetic diene rubber selected from the group consisting of
   (a) polybutadiene, and
   (b) copolymers of butadiene and monomers such as styrene and acrylonitrile, and
  having latex particles at least 80 percent by weight of which being more than 0.1 micron in diameter, and from
  (2) 65 to 35 percent by weight of a monomer composition consisting of methyl methacrylate, styrene and acrylonitrile, the components of said monomer composition being defined by the shaded area of the graph of FIGURE 2.

References Cited

UNITED STATES PATENTS 3,170,964 2/1965 Grabowski _____ 260—876
3,238,275 3/1966 Calvert _____ 260—880
3,336,417 8/1967 Sakuma et al. ____ 260—876 XR

FOREIGN PATENTS 1,358,597 3/1964 France.
 965,851 8/1964 Great Britain.
1,052,797 12/1966 Great Britain.

MURRAY TILLMAN, Primary Examiner

K. E. KUFFNER, Assistant Examiner

U.S. Cl. X.R.

260—880